(12) United States Patent
Kametaka et al.

(10) Patent No.: US 7,651,275 B2
(45) Date of Patent: Jan. 26, 2010

(54) WHEEL BEARING APPARATUS

(75) Inventors: Kouji Kametaka, Iwata (JP); Hisashi Ohtsuki, Iwata (JP); Kazuo Komori, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/371,685

(22) Filed: Feb. 16, 2009

(65) Prior Publication Data
US 2009/0148091 A1   Jun. 11, 2009

Related U.S. Application Data

(63) Continuation of application No. PCT/JP2007/000876, filed on Aug. 13, 2007.

(30) Foreign Application Priority Data

| | | |
|---|---|---|
| Aug. 17, 2006 | (JP) | ............................. 2006-222346 |
| Aug. 17, 2006 | (JP) | ............................. 2006-222348 |
| Aug. 30, 2006 | (JP) | ............................. 2006-233059 |
| Aug. 30, 2006 | (JP) | ............................. 2006-233063 |

(51) Int. Cl.
*F16C 13/00* (2006.01)

(52) U.S. Cl. .................................... 384/544

(58) Field of Classification Search ................. 384/544, 384/589, 625
See application file for complete search history.

(56) References Cited

U.S. PATENT DOCUMENTS

2006/0257063 A1 * 11/2006 Shigeoka .................... 384/544

FOREIGN PATENT DOCUMENTS

| JP | 11182537 | A | * | 7/1999 |
|---|---|---|---|---|
| JP | 2003072310 | A | * | 3/2003 |
| JP | 2004108449 | A | * | 4/2004 |
| JP | 2005081856 | A | * | 3/2005 |
| JP | 2005214229 | A | * | 8/2005 |
| JP | 2005314459 | A | * | 11/2005 |
| JP | 2006137297 | A | * | 6/2006 |

* cited by examiner

*Primary Examiner*—Thomas R Hannon
(74) *Attorney, Agent, or Firm*—Harness, Dickey & Pierce, P.L.C.

(57) ABSTRACT

A vehicle wheel bearing apparatus has a double row angular ball bearing including double rows of ball groups. A pitch circle diameter of the double row ball group of the outer side is larger than a pitch circle diameter of the double row ball group of the inner side. The outer member is made of medium carbon steel including carbon of 0.40~0.80% by weight. It is hardened by high frequency induction quenching so that each of the outer raceway surfaces is formed with a hardened layer having a surface hardness of 58~64 HRC. The effective depth of hardened layer is set at at least 2 mm. The minimum wall thickness of the outer member at these outer raceway surfaces is set at at least 4 mm.

14 Claims, 11 Drawing Sheets

[ Fig 1 ]
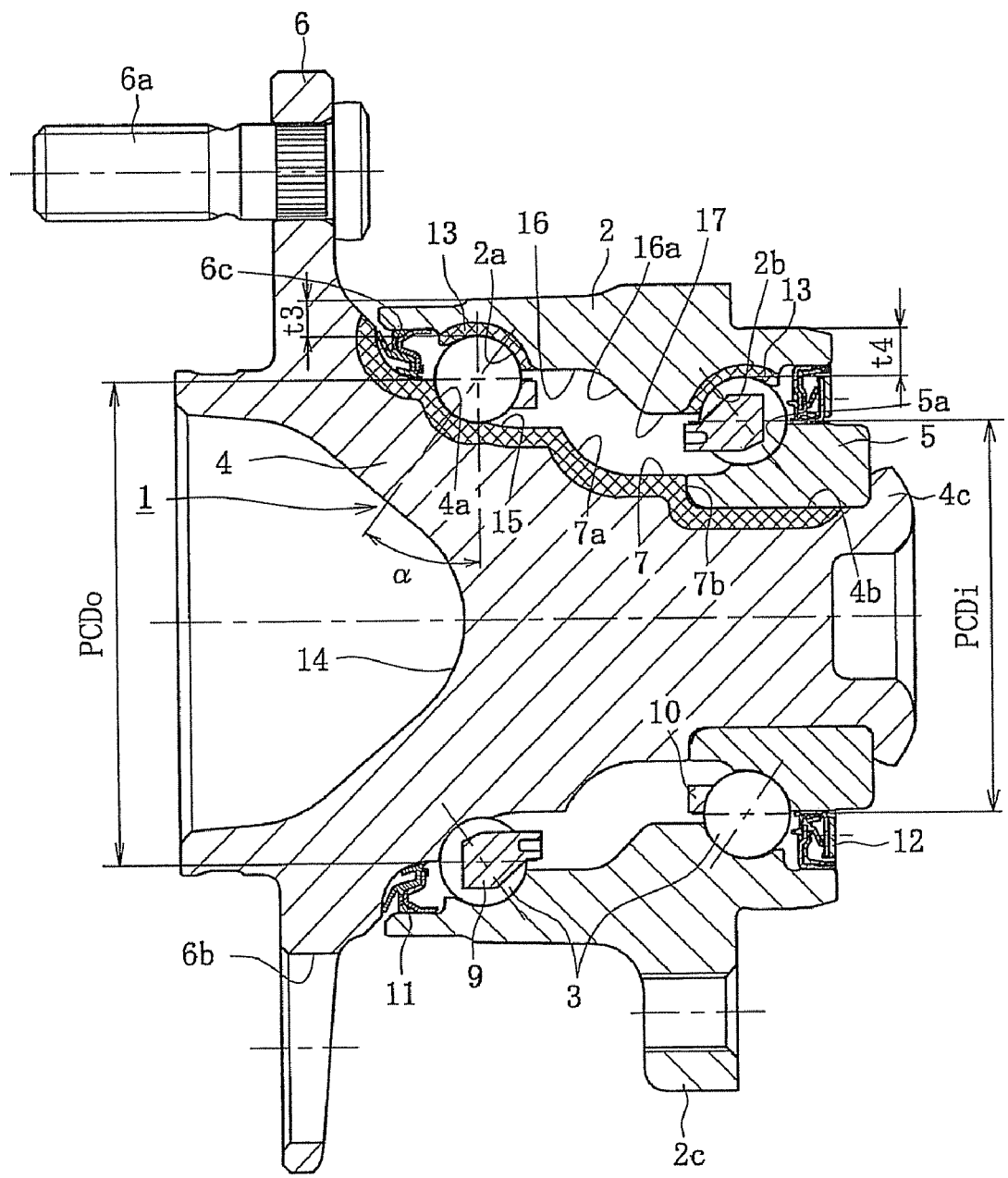

[Fig 2]
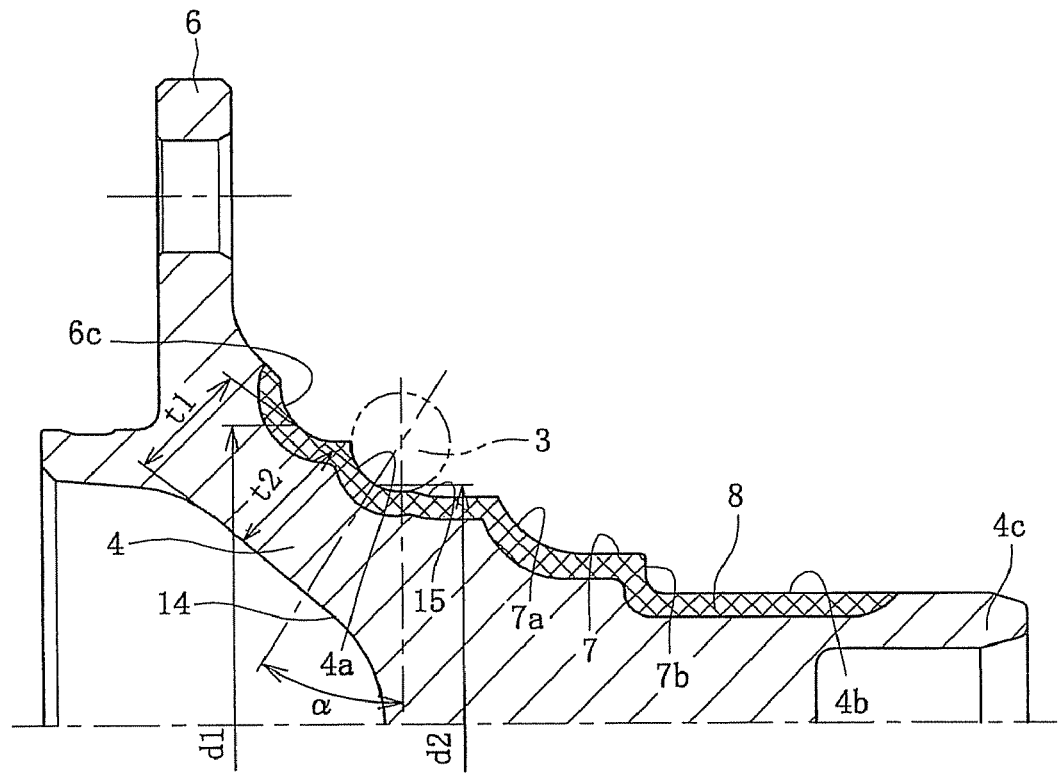
[Fig 3]
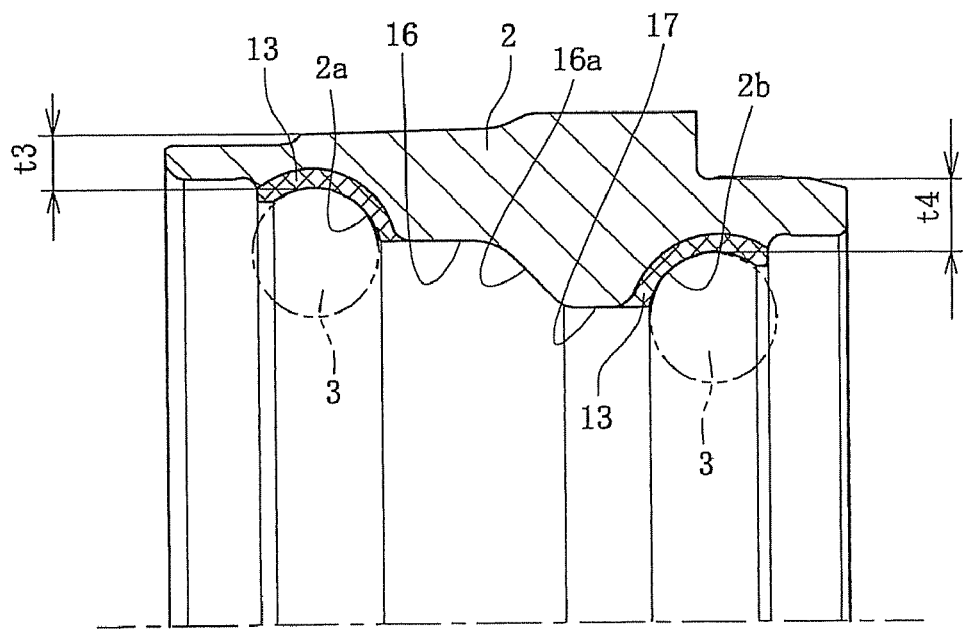

[Fig 4]
(a)
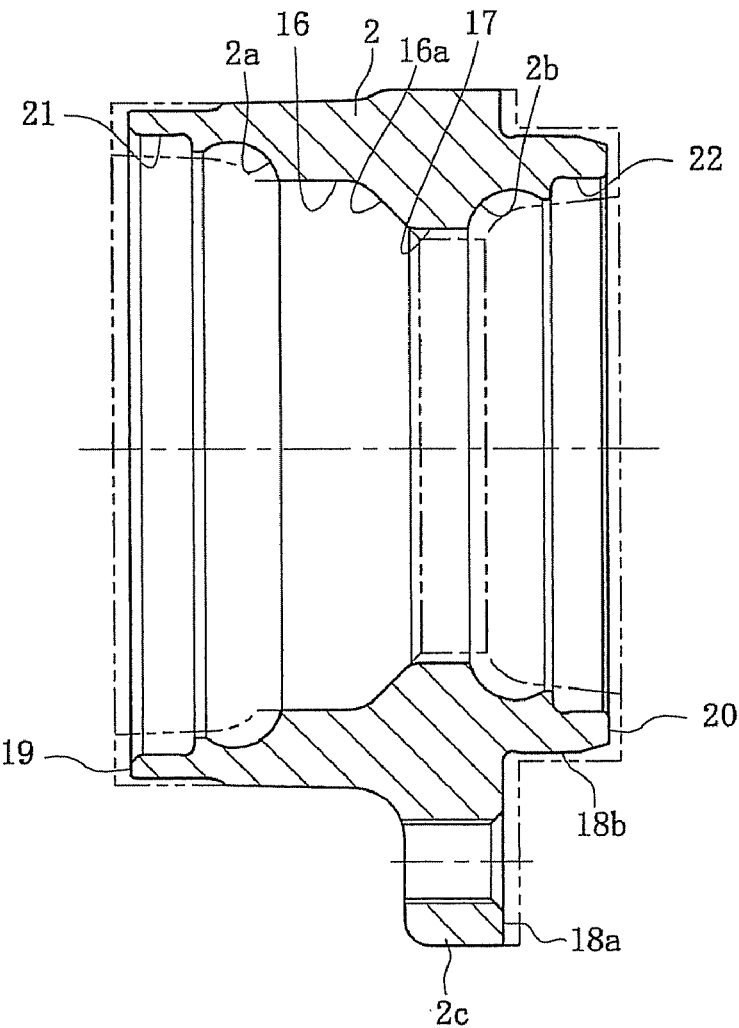
(b)
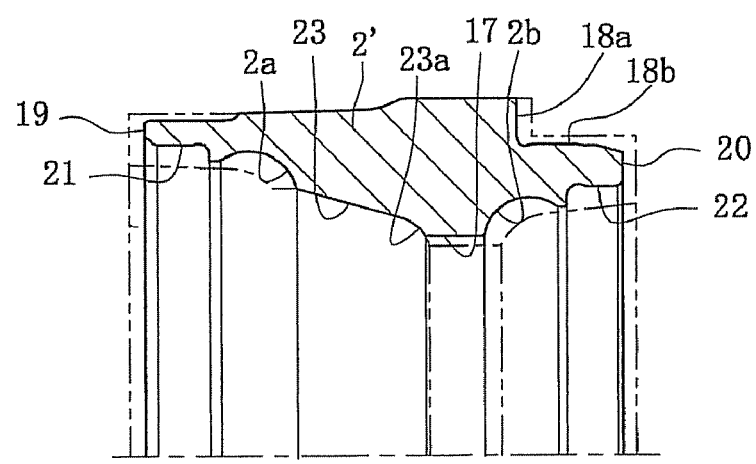

[Fig 5]
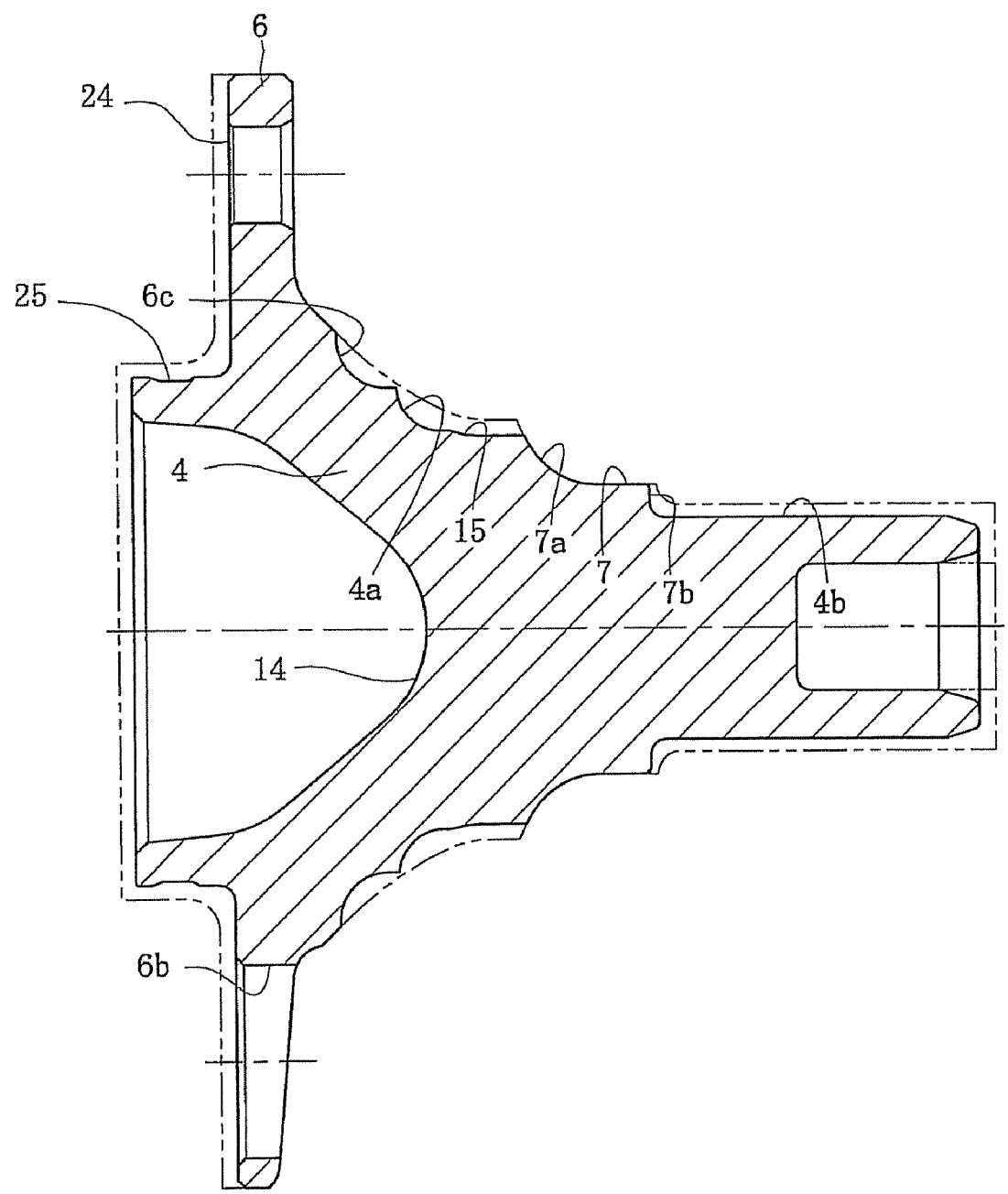

[Fig 6]
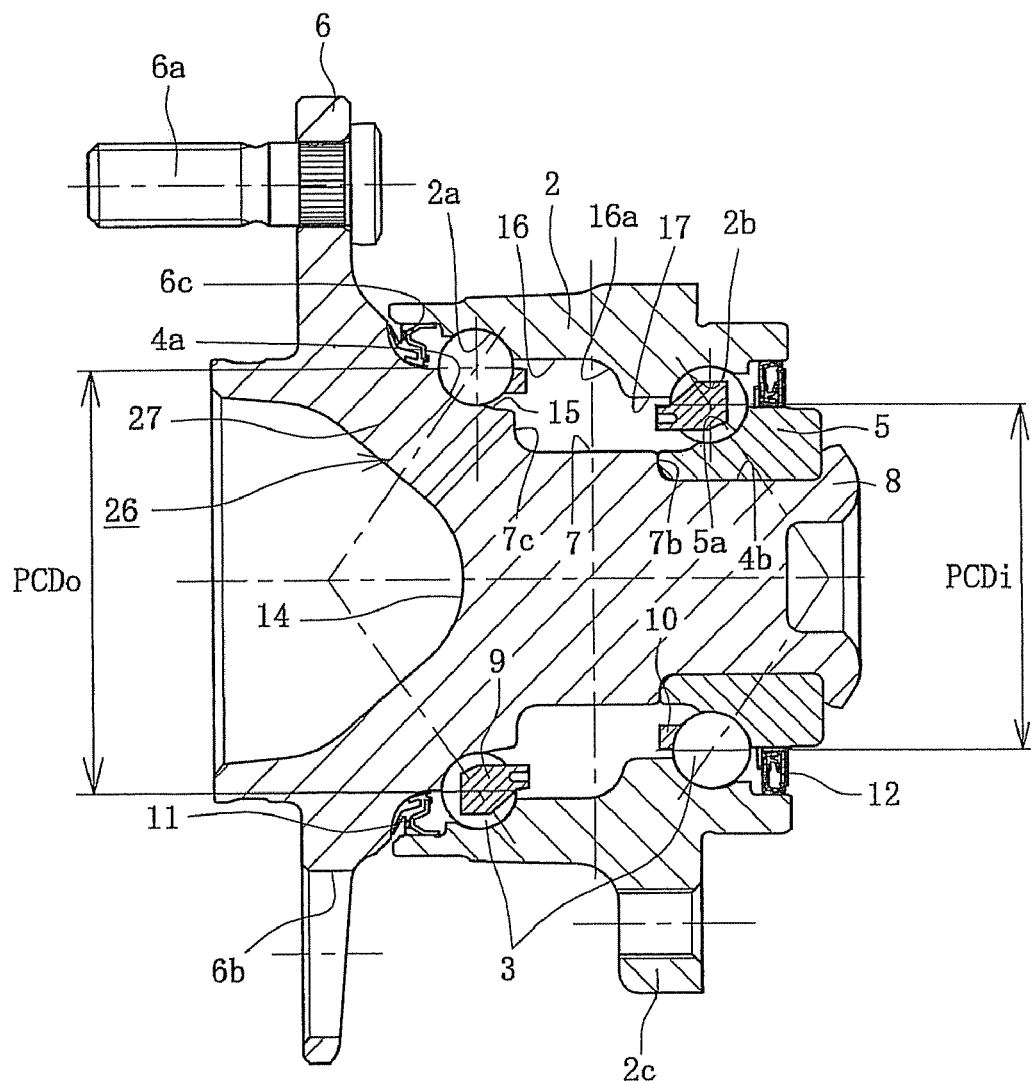

[Fig 7]
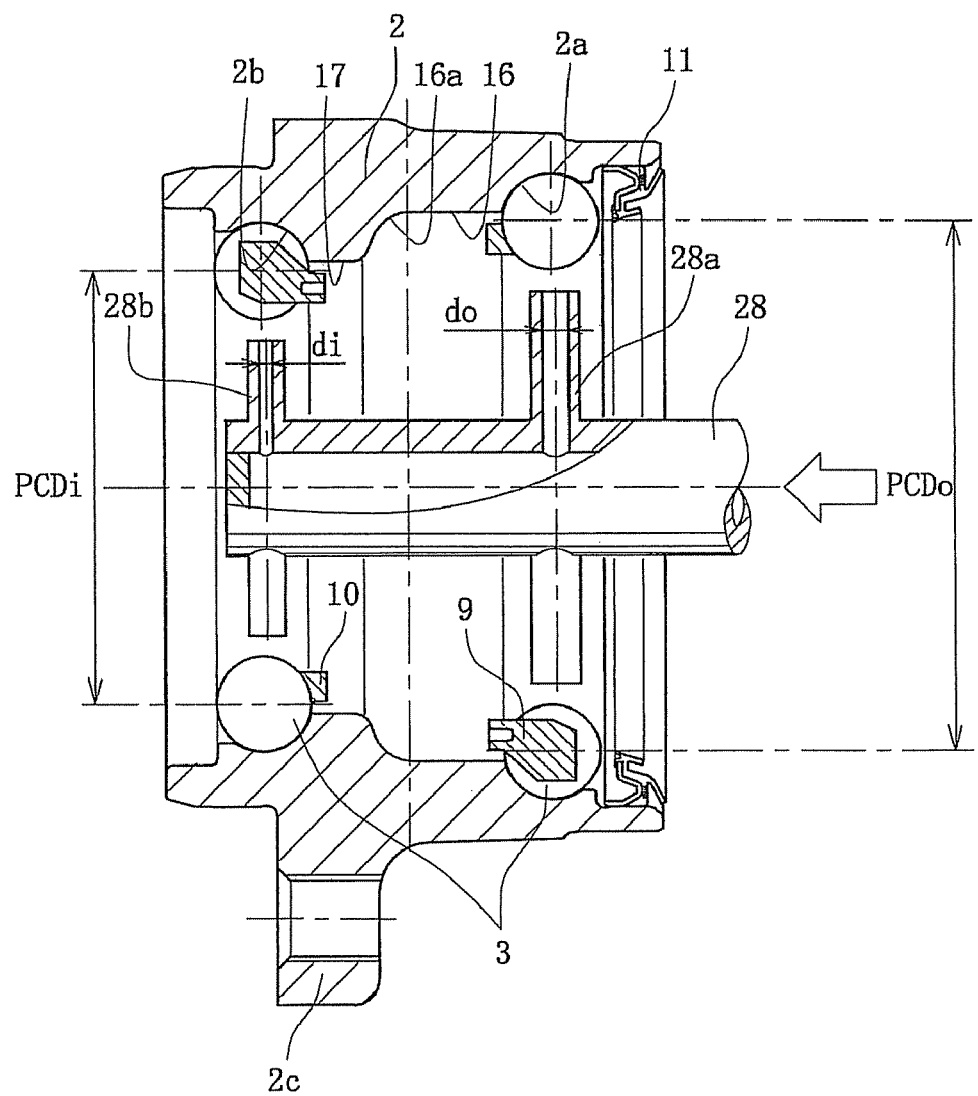

[Fig 8]
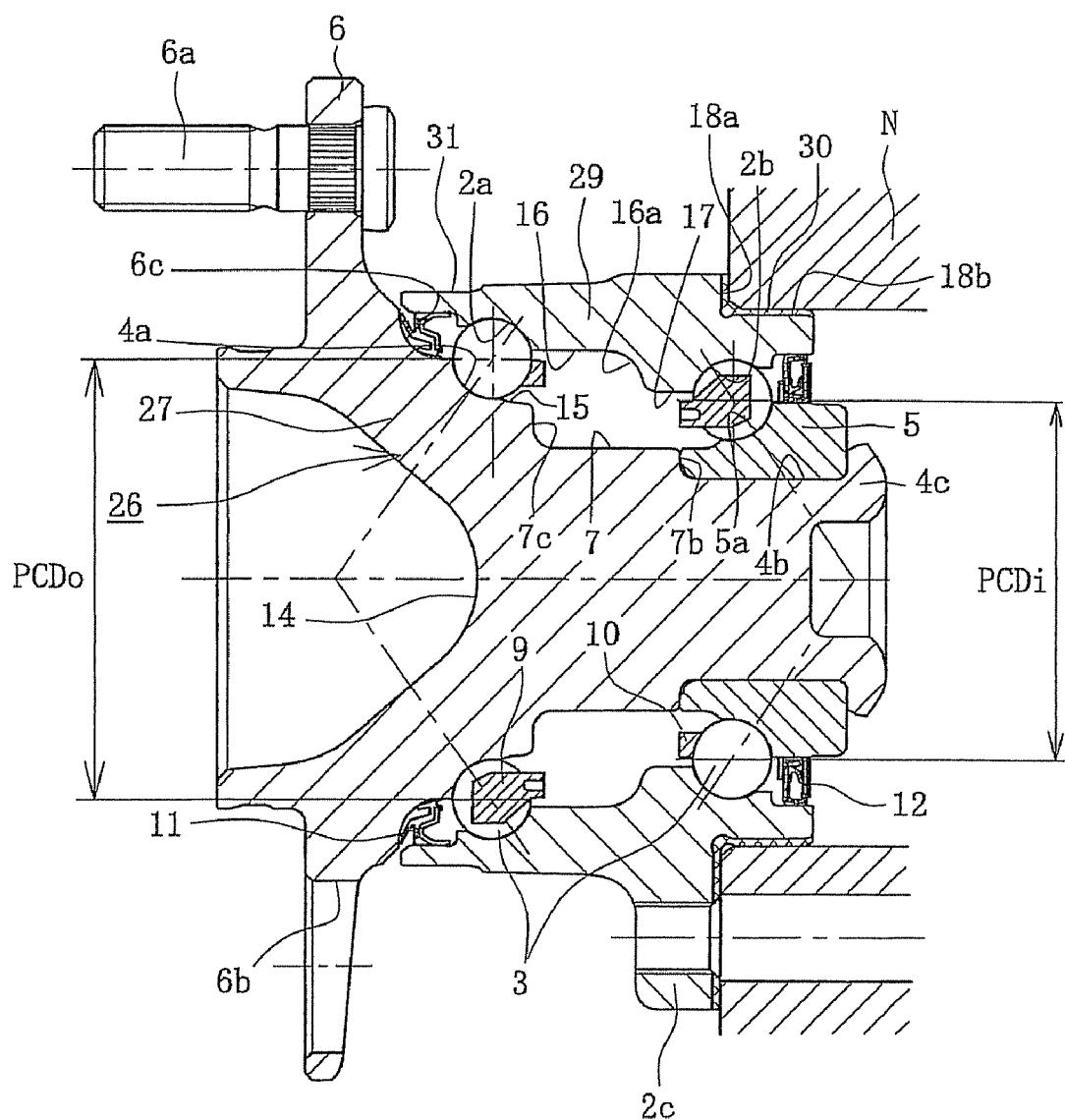

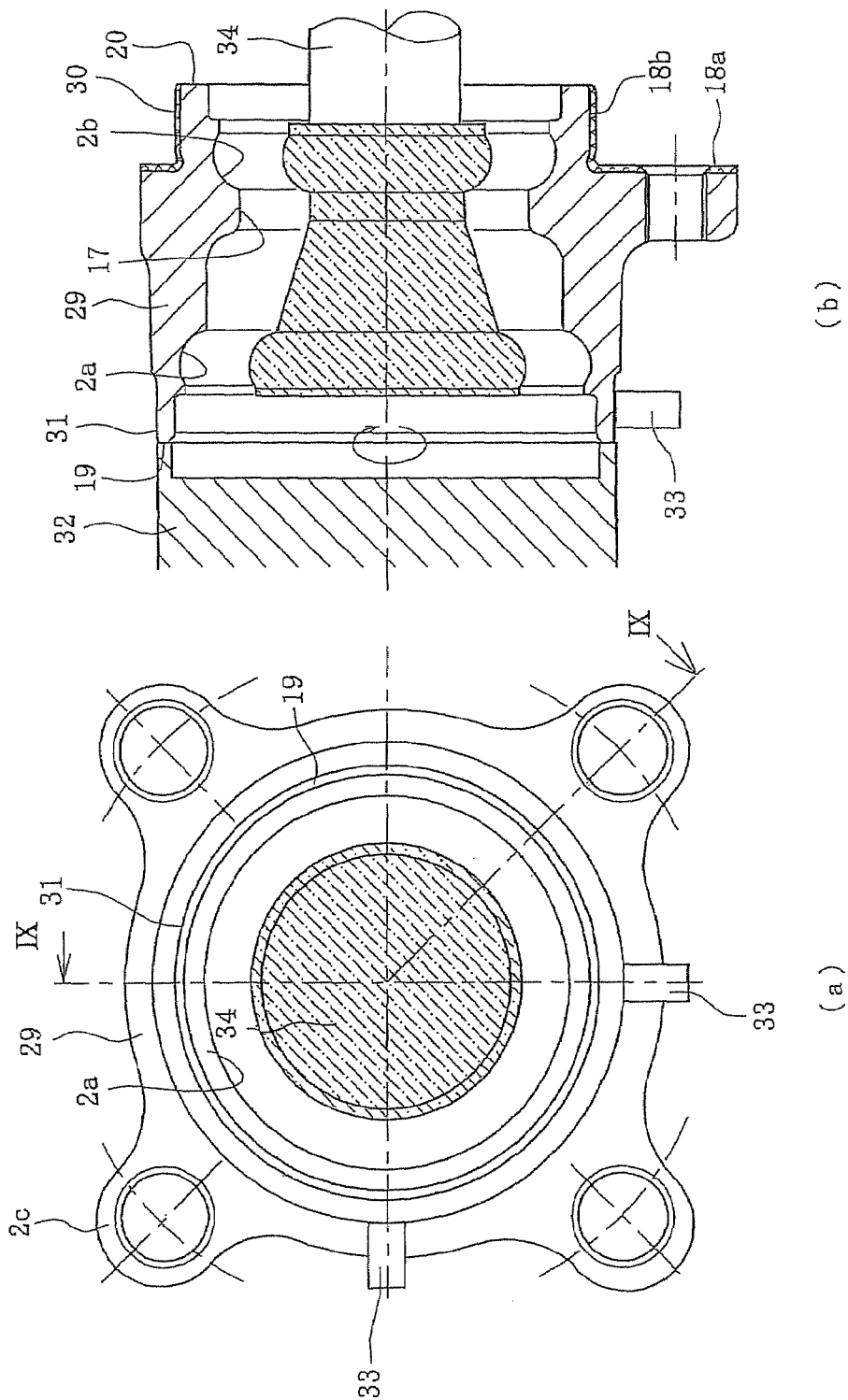
[Fig 9]

[Fig 10]
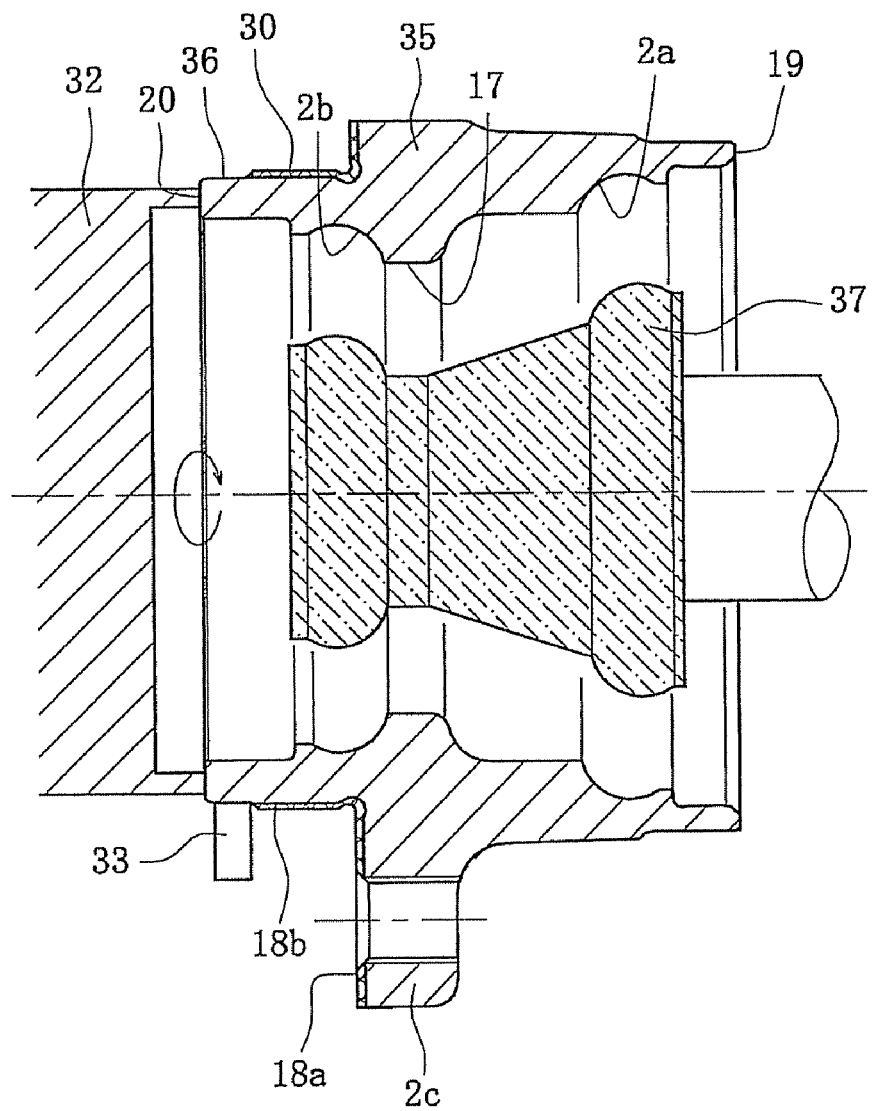

[Fig 11]
PRIOR ART
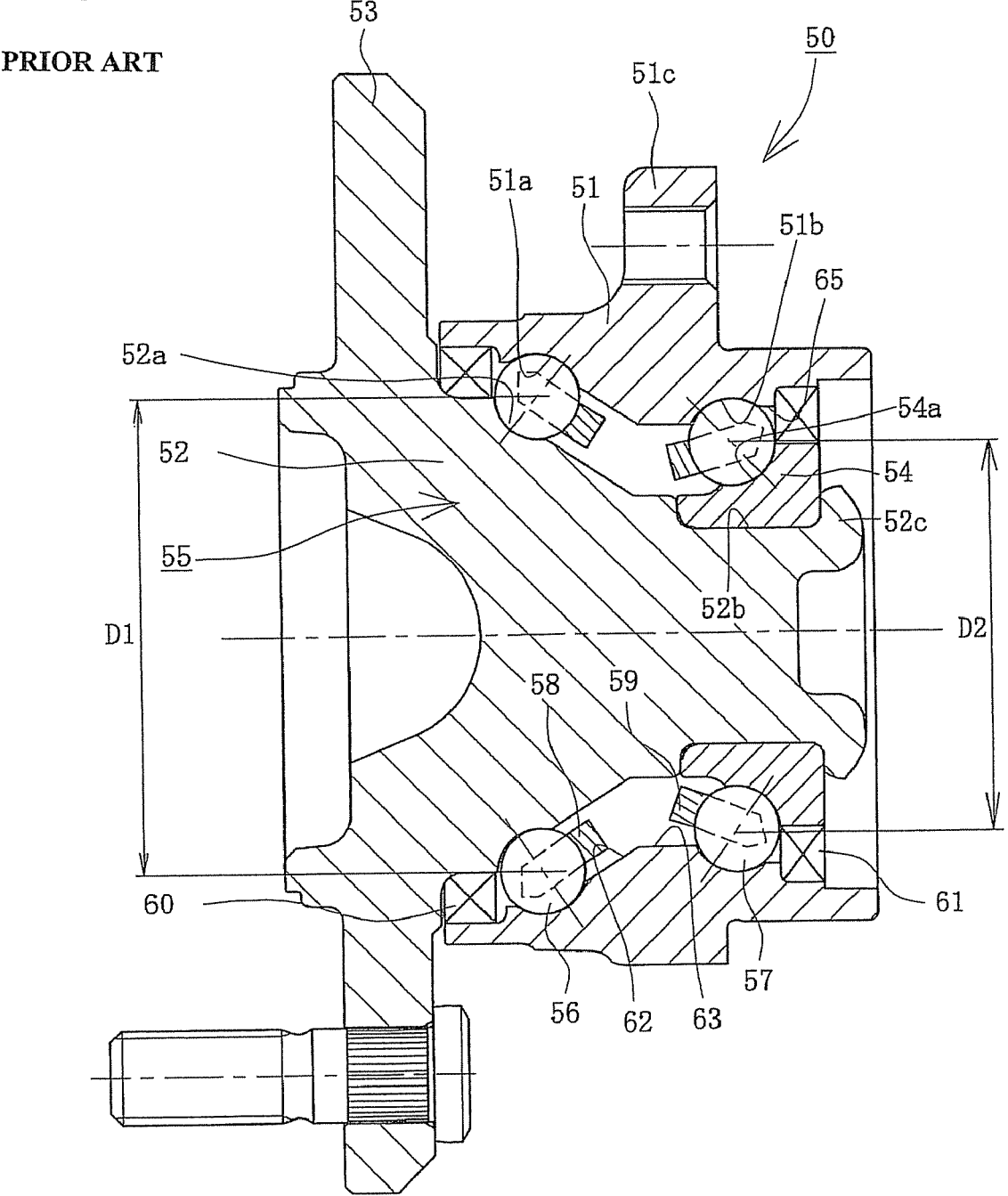

[Fig 12]
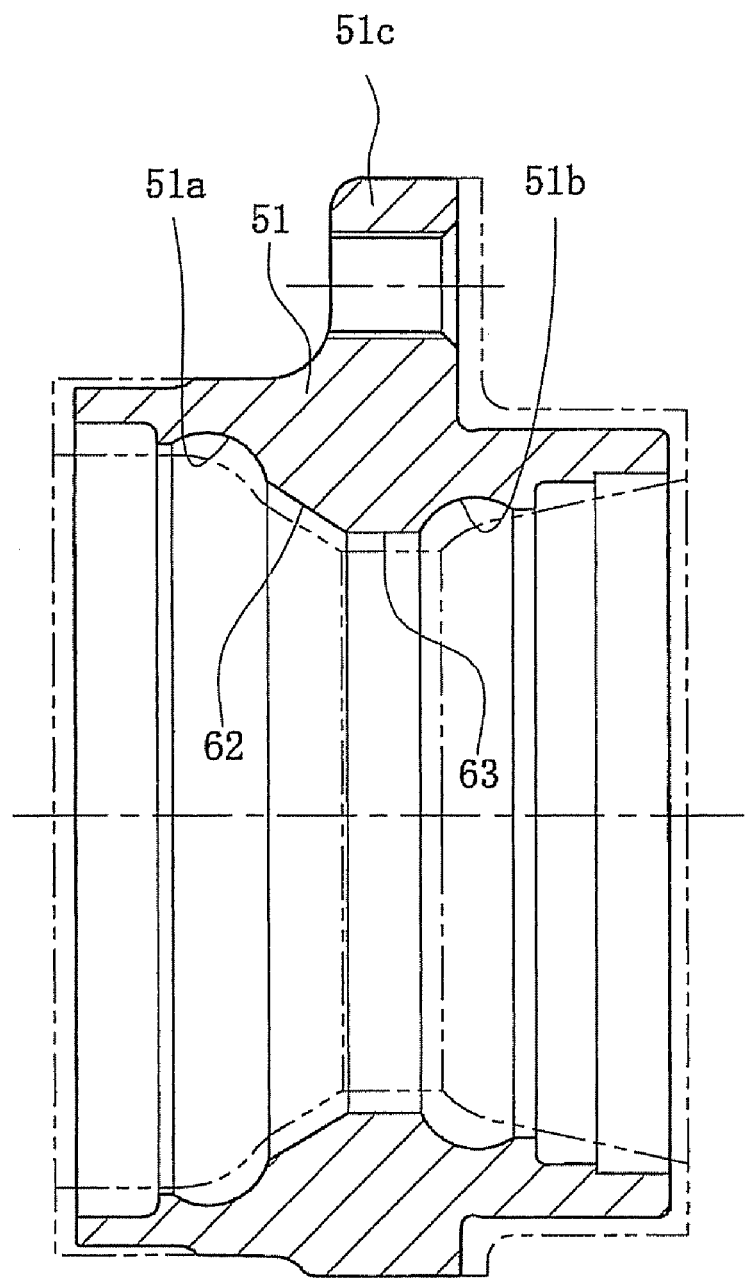

WHEEL BEARING APPARATUS

CROSS-REFERENCE TO RELATED APPLICATIONS

This application is a continuation of International Application No. PCT/JP2007/000876, filed Aug. 13, 2007 which claims priority to Japanese Application Nos. 2006-222346, filed Aug. 17, 2006; 2006-222348, filed Aug. 17, 2006; 2006-233063, filed Aug. 30, 2006; and 2006-233059, filed Aug. 30, 2006. The disclosures of the above applications are incorporated herein by reference.

FIELD

The present disclosure relates to a vehicle wheel bearing apparatus and, more particularly, to a wheel bearing apparatus that can solve the antinomic problems of reducing the weight and size of the bearing apparatus while improving the life of the bearing apparatus.

BACKGROUND

Vehicle wheel bearing apparatus is adapted to freely rotatably support a wheel hub for mounting a wheel, via a rolling bearing, and adopted for use with an inner ring rotation type for a driving wheel and both inner ring rotation and outer ring rotation types for a driven wheel. A double row angular ball bearing is widely used in such a bearing apparatus. The double row angular ball bearing has a desirable bearing rigidity, high durability against misalignment and small rotation torque required for fuel consumption. The double row angular contact ball bearing has a plurality of balls interposed between a stationary ring and a rotational ring. The balls contact the stationary and rotational rings at a predetermined contact angle.

The vehicle wheel bearing apparatus is broadly classified into four generation structures. In the first generation type, a wheel bearing with a double row angular contact ball bearing is fit between a knuckle forming part of a suspension and a wheel hub. In a second generation type, a body mounting flange or a wheel mounting flange is formed directly formed on the outer circumference of an outer member. In a third generation type, one of the inner raceway surfaces is formed directly on the outer circumference of the wheel hub. In a fourth generation type, the inner raceway surfaces are formed directly on the outer circumferences of the wheel hub and the constant velocity universal joint. In the description below, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

In prior art wheel bearing apparatus formed with double row rolling bearings, the bearing arrangements in both the left and right rows are the same. Thus, it has a sufficient rigidity during straight way running; however, optimum rigidity cannot always be obtained during curved way running. That is, the positional relationship between the wheels and the bearing apparatus is usually designed so that the weight of the vehicle acts substantially on the middle between the rows of the bearing balls during straight way running. During curve running, larger radial loads and larger axial loads are applied to axles of the vehicle on the side opposite to a curving direction (i.e. axles of the left hand side of vehicle when right hand curving). Accordingly, it is effective to have a larger rigidity in the bearing row of the outer side than that of the bearing row of inner side. This improves the durability and strength of the bearing apparatus. Thus, a known vehicle wheel bearing apparatus is shown in FIG. 11 that can have a high rigidity without enlargement of the bearing apparatus.

The vehicle wheel bearing apparatus 50 is formed by a double row angular ball bearing. An outer member 51 is integrally formed on its outer circumference with a body mounting flange 51c to be mounted on a knuckle (not shown) of a vehicle. Its inner circumference includes double row outer raceway surfaces 51a, 51b. An inner member 55 includes a wheel hub 52 with a wheel mounting flange 53 integrally formed at one end to mount a wheel (not shown). One inner raceway surface 52a is formed on its outer circumference opposite to one 51a of the double row outer raceway surfaces 51a, 51b. A cylindrical portion 52b axially extends from the inner raceway surface 52a. An inner ring 54 is fit onto the cylindrical portion 52b. Its outer circumference includes the other inner raceway surface 54a opposite to the other raceway surface 51b of the double row outer raceway surfaces 51a, 51b. Double row balls 56, 57 are freely rollably contained between the outer raceway surfaces 51a, 51b and inner raceway surfaces 52a, 54a of the inner member 55. Cages 58, 59 rollably hold the balls 56, 57.

The inner ring 54 is axially immovably secured by a caulked portion 52c formed by plastically deforming the cylindrical portion 52b of the wheel hub 52 radially outward. Seals 60, 61 are mounted in annular openings formed between the outer member 51 and the inner member 55. The seals prevent leakage of grease contained within the bearing apparatus and the entering of rain water or dusts into the bearing apparatus from the outside.

A pitch circle diameter D1 of the outer side ball group 56 is set larger than a pitch circle diameter D2 of the inner side ball group 57. Accordingly, the diameter of the inner raceway surface 52a of the wheel hub 52 is larger than that of the inner raceway surface 54a of the inner ring 54. The outer raceway surface 51a of the outer side of the outer member 51 is larger than that of the outer raceway surface 51b of the inner side of the outer member 51. Also the number of outer side balls 56 is larger than the number of the inner side balls 57. The pitch circle diameter D1 of the outer side is set larger than the pitch circle diameter D2 of the inner side (D1>D2). Thus, it is possible to obtain a large rigidity for the bearing apparatus 50 and thus to extend its life. Patent Document 1: Japanese Laid-open Patent Publication No. 108449/2004.

In the prior art bearing apparatus 50, the pitch circle diameter D1 of the outer side ball group 56 is set larger than the pitch circle diameter D2 of the inner side ball group 57. Also, the diameter of the inner raceway surface 52a of the wheel hub 52 is larger than that of the inner raceway surface 54a of the inner ring 54. Thus, it is possible to increase the rigidity of the outer side bearing row and to extend the life of the wheel bearing apparatus 50. However, since both the outer member 51 and the wheel hub 52 are enlarged at their outer sides, this inevitably increases their weight, by the enlargement of their diameter, and thus a reduction of weight of the wheel bearing apparatus is limited.

On the contrary, if the wall thickness of the outer member 51 is excessively reduced to reduce the weight of the outer member 51, a problem is caused with the generation of quenching cracks when the outer raceway surfaces 51a, 51b are formed with hardened layers by high frequency induction quenching. Accordingly, it is necessary to determine the limit of the wall thickness of the outer member in consideration of an increase of the strength and durability as well as a reduction of the weight and size of the outer member.

In addition, in the prior art wheel bearing apparatus 50, the outer member 51 and the wheel hub 52 are manufactured from bar members as blank and go through various machining processes such as forging, turning, heat treatment, grinding, super finishing, etc. For example, as shown in FIG. 12, an outline of the outer member 51 is initially forged. Predetermined grinding allowance regions remain on an inner side face of the body mounting flange 51c and an inner side outer circumferential surface contacting the knuckle to an inner circumferential surface (shown by two-dot chain lines).

In addition, the outer member 51 is formed with the double row outer raceway surfaces 51a, 51b having different groove diameters. The groove shoulders 62, 63 are ground to predetermined dimensions in order to prevent a so-called "shoulder riding-over" where oval lines of contact of the balls 56, 57 ride over and derail from the outer railway surfaces 51a, 51b when the moment load is applied to the wheel bearing apparatus. The dimension of the groove shoulder 63 is strictly defined since influence of the moment load caused on a corner portion (boundary) between inner side outer raceway surface 51b and the groove shoulder 63 is larger than that caused on the outer side outer raceway surface 51a. Thus, an edge load would be caused by riding-over of the balls 56, 57. In this specification the term "edge load" means an excessive stress concentration generated on a corner of a member that would cause a premature peeling on a surface of the member.

The turning of the groove shoulders 62, 63 of the outer member 51 not only causes a material loss to the outer member 51 but increases the machining steps and thus increases the manufacturing cost. In addition, since the groove shoulder 63 is formed by punching during the forging process, it is a subject on how material loss of a blank can be reduced.

In the wheel bearing apparatus 50, a left and right asymmetric bearing arrangement exist. Thus, the inside space volumes are different in the inner and outer side bearing rows. Grease is evenly charged in both the inner and outer side bearing rows despite the difference in their inside space volumes. The inner side bearing row has a smaller inside space volume and tends to be filled with an excessive amount of grease. Such an excessive amount of grease causes grease leakage which deteriorate the effectiveness of a brake and increases rotational torque of the wheel bearing apparatus lowering the fuel consumption of the vehicle.

SUMMARY

It is, therefore, an object of the present disclosure to provide a vehicle wheel bearing apparatus that can solve the antinomic problems of reducing the weight and size of the bearing apparatus while increasing the rigidity of the bearing apparatus. Also, it improves the life of the bearing apparatus.

It is another object of the present disclosure to provide a vehicle wheel bearing apparatus that can increase the rigidity of the bearing while reducing its weight and size. Also, it reduces the manufacturing cost of the wheel bearing apparatus by reducing its material loss.

It is a further object of the present disclosure to provide a wheel bearing apparatus that can keep an optimum lubricating condition and thus improve the life of the wheel bearing apparatus.

In order to achieve the object of the present disclosure, a vehicle wheel bearing apparatus is provided comprising an outer member formed on its inner circumference with double row outer raceway surfaces. An inner member is formed, on its outer circumferential surface, with double row inner raceway surfaces arranged opposite to the double row outer raceway surfaces. Double row ball groups are freely rollably contained between the outer raceway surfaces and inner raceway surfaces, respectively, of the outer member and the inner members. The outer member is made of medium carbon steel including carbon of 0.40~0.80% by weight. It is hardened by high frequency induction quenching so that each of the outer raceway surfaces is formed with a hardened layer having a surface hardness of 58~64 HRC. The effective depth of the hardened layer is set at at least 2 mm. The minimum wall thickness of the outer member at these outer raceway surfaces is set at at least 4 mm.

The outer member is made of medium carbon steel including carbon of 0.40~0.80% by weight. It is hardened by high frequency induction quenching so that each of the outer raceway surfaces is formed with a hardened layer with a surface hardness of 58~64 HRC. The effective depth of hardened layer is set at at least 2 mm. The minimum wall thickness of the outer member at these outer raceway surfaces is set at at least 4 mm. Thus, it is possible to prevent the generation of quenching cracks. Also, it is possible to solve the antinomic problems of reducing the weight and size of the bearing apparatus while increasing the rigidity of the bearing apparatus. Thus, this improves the life of the bearing apparatus.

It is preferable that a pitch circle diameter of the double row ball group of the outer side is larger than a pitch circle diameter of the double row ball group of the inner side. This makes it possible to increase the rigidity of the outer side bearing as compared with that of inner side bearing. This effectively utilizes the bearing space and thus improves the life of the bearing.

It is preferable that the outer diameter of each ball of the ball groups is the same as each other. The number of balls of the outer side group is larger than the number of balls of the inner side group. This makes it possible to improve the life of bearing while keeping the bearing rigidity.

It is also preferable that the inner member comprises a wheel hub and an inner ring. The wheel hub has a wheel mounting flange integrally formed at one end. One inner raceway surface is formed on the outer circumference opposite to one of the double row outer raceway surfaces. A cylindrical portion axially extends from the inner raceway surface via a shaft-shaped portion. The inner ring is fit onto the cylindrical portion of the wheel hub, via a predetermined interference, and formed on its outer circumference with the other inner raceway surface opposite to the other raceway surface of the double row outer raceway surfaces. A predetermined hardened layer is continuously formed by high frequency induction quenching in a region from an inner side base of the wheel mounting flange of the wheel hub to the cylindrical portion. A substantially conical recess is formed at an outer side end portion of the wheel hub. The depth of the recess extends to at least near the bottom of the inner raceway surface of the wheel hub so that a wall thickness of the wheel hub at the inner raceway surface is set within a predetermined range. A wall thickness of the outer side end of the wheel hub is substantially constant corresponding to the configuration of the recess. It has at least twice the effective depth of the hardened layer. This also makes it possible to prevent the generation of quenching cracks. Also, it solves the antinomic problems of reducing the weight and size of the bearing apparatus while increasing the rigidity of the bearing apparatus. Thus, this improves the life of the bearing apparatus.

It is preferable that the minimum thickness of the wheel hub at the inner raceway surface is set within a range of 0.2~0.3 times the diameter at that position. This makes it possible to achieve the weight reduction while keeping the strength and rigidity of the wheel hub corresponding to the conditions of use of the wheel bearing.

It is also preferable that shoulders are formed, respectively, adjacent to the double row outer raceway surfaces. A stepped portion between the shoulder of the larger diameter side and the shoulder of the smaller diameter side is formed by a tapered surface of a predetermined inclination. Alternatively, a shoulder of the larger diameter side is formed as a tapered surface extending from the shoulder of the smaller diameter side toward the outer raceway surface of the larger diameter side while increasing its diameter. The stepped portion and the shoulders remain as forged surfaces. This makes it possible to reduce the material loss without diminishing the strength and rigidity of the outer member. This improves the machining accuracy while increasing the plastic flowability during the forging process. In addition this makes the punching process easy and the number of the punching steps is reduced. Also, the material loss of the blank is reduced to achieve reduction of the manufacturing cost.

It is preferable that the outer member is integrally formed on its outer circumference with a body mounting flange to be mounted on a knuckle of a vehicle body. The shoulder of the larger diameter side extends to a position near the base of the body mounting flange.

It is also preferable that the shoulder of the larger diameter side is formed by a tapered surface of a predetermined inclination. A stepped portion between the shoulder of the larger diameter side and the shoulder of the smaller diameter side has a cross-section of a circular arc configuration.

It is preferable that a counter portion of the inner raceway surface of the wheel hub is formed with a cylindrical configuration. A stepped portion connecting the counter portion and the shaft-shaped portion is formed with a cross-section having a circular arc or tapered configuration. The shaft-shaped portion and the stepped portion remain as forged surfaces. This makes it possible to reduce the material loss without diminishing the strength and rigidity of the outer member. This improves the machining accuracy while increasing the plastic flowability during the forging process.

It is preferable that an amount of grease filled within each of the left and right bearing rows is set in proportion to a volume ratio of the inside space within each of left and right bearing rows. This makes it possible to assure an optimum filling amount of grease although the left and right bearing rows have different pitch circle diameters and thus different inside space volumes. Accordingly, it is possible to provide a wheel bearing apparatus that has a high bearing rigidity and an increased bearing life while keeping optimum lubricating conditions.

It is also preferable that an amount of grease filled within each of the left and right bearing rows is set within a range of 40~60% of the volume of the inside space of each of the left and right bearing rows. This makes it possible to prevent leakage of grease and increase the rotational torque of the bearing.

It is preferable that the outer member is fit into a light alloy knuckle with at least the outer circumferential surface of the outer member contacting the knuckle formed with an insulating coating. A circumferential surface other than the outer circumferential surface of the outer member contacting the knuckle is formed with a cylindrical supporting surface ground over a predetermined axial length. This makes it possible to have an excellent insulation between metals of the knuckle and the outer member since the supporting surface does not contact the knuckle when the double row outer raceway surfaces are ground. Accordingly, it is possible to prevent the generation of electric corrosion on the knuckle that would be caused by a combination of the steel outer member and the light alloy knuckle and thus to provide a wheel bearing having improved reliability.

It is preferable that the outer member is integrally formed, on its outer circumference, with a body mounting flange to be mounted on the knuckle. The knuckle is fit onto an inner side outer circumference of the body mounting flange. The supporting surface is formed on the outer circumferential surface of an outer side end of the outer member.

It is also preferable that the outer member is integrally formed, on its outer circumference, with a body mounting flange to be mounted on the knuckle. The knuckle is fit onto an inner side outer circumference of the body mounting flange. A removed insulating coating cylindrical portion is formed over a predetermined length from an inner side end face of the outer member. The removed insulating coating removed cylindrical portion functions as the supporting surface.

The vehicle wheel bearing apparatus has its outer member made of medium carbon steel including carbon of 0.40~0.80% by weight. It is hardened by high frequency induction quenching so that each of the outer raceway surfaces is formed with a hardened layer having a surface hardness of 58~64 HRC. The effective depth of hardened layer is set at at least 2 mm. The minimum wall thickness of the outer member at these outer raceway surfaces is set at at least 4 mm. Thus, it is possible to prevent the generation of quenching cracks, and to solve the antinomic problems of reducing the weight and size of the bearing apparatus while increasing the rigidity of the bearing apparatus. Thus, this improves the life of the bearing.

A vehicle wheel bearing apparatus comprises an outer member integrally formed, on its outer circumference, with a body mounting flange to be mounted on a knuckle of a vehicle. Its inner circumference includes double row outer raceway surfaces. An inner member includes a wheel hub with a wheel mounting flange integrally formed at one end to mount a wheel. One inner raceway surface is formed on its outer circumference opposite to one of the double row outer raceway surfaces. A cylindrical portion axially extends from the inner raceway surface. An inner ring is fit onto the cylindrical portion. The inner ring is formed on its outer circumference with the other inner raceway surface opposite to the other raceway surface of the double row outer raceway surfaces. Double row balls are freely rollably contained between the outer raceway surfaces and inner raceway surfaces of the inner member. A pitch circle diameter of the double row ball group of the outer side is larger than a pitch circle diameter of the double row ball group of the inner side. The outer member is made of medium carbon steel including carbon of 0.40~0.80% by weight. It is hardened by high frequency induction quenching so that each of the outer raceway surfaces is formed with a hardened layer having a surface hardness of 58~64 HRC. The effective depth of hardened layer is set at at least 2 mm. The minimum wall thickness of the outer member at these outer raceway surfaces is set at at least 4 mm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of a vehicle wheel bearing apparatus.

FIG. 2 is an enlarged longitudinal sectional view of a wheel hub of FIG. 1.

FIG. 3 is an enlarged longitudinal sectional view of an outer member of FIG. 1.

FIG. 4(a) is a longitudinal section view of an outer member of FIG. 1 after forging.

FIG. 4(b) is a longitudinal section view of a modification of FIG. 4(a).

FIG. 5 is an explanatory longitudinal section view of the wheel hub of FIG. 1 after forging.

FIG. 6 is a longitudinal section view of a second embodiment of a vehicle wheel bearing apparatus.

FIG. 7 is a longitudinal section view of the wheel bearing apparatus of FIG. 6 showing a grease filling step.

FIG. 8 is a longitudinal section view of a third embodiment of a vehicle wheel bearing apparatus.

FIG. 9(a) is a front elevation view of a method for machining the outer member of FIG. 8.

FIG. 9(b) is a longitudinal section view along line IX-IX of FIG. 9(a).

FIG. 10 is a longitudinal section view of a modification of the outer member showing grinding work.

FIG. 11 is a longitudinal section view of a prior art vehicle wheel bearing apparatus.

FIG. 12 is an explanatory longitudinal section view of the outer member of FIG. 11 showing its configuration after forging.

DETAILED DESCRIPTION

Preferable embodiments of the present disclosure will be hereinafter described with reference to the drawings.

FIG. 1 is a longitudinal section view of a first embodiment of a vehicle wheel bearing apparatus. FIG. 2 is an enlarged longitudinal sectional view of a wheel hub of FIG. 1. FIG. 3 is an enlarged longitudinal sectional view of an outer member of FIG. 1. FIG. 4(a) is a longitudinal section view of an outer member of FIG. 1 after forging. FIG. 4(b) is a longitudinal section view of a modification of FIG. 4(a). FIG. 5 is an explanatory longitudinal section view of the wheel hub of FIG. 1 after forging.

The vehicle wheel bearing apparatus shown in FIG. 1 is a third generation type used for a driven wheel. It includes an inner member 1, an outer member 2, and double row rolling element (ball) groups 3, 3 rollably contained between the inner and outer members 1, 2. The inner member 1 has the wheel hub 4 and an inner ring 5 press fit onto the wheel hub 4.

The wheel hub 4 is integrally formed with a wheel mounting flange 6 at its one end. One (outer side) inner raceway surface 4a is on its outer circumference. A cylindrical portion 4b extends from the inner raceway surface 4a through a shaft-shaped portion 7. Hub bolts 6a are arranged on the wheel mounting flange 6 equidistantly along the periphery of the wheel mounting flange 6. Circular apertures 6b are formed between the hub bolts 6a. These circular apertures 6b contribute not only to the weight reduction of the bearing apparatus but to the passage of any fastening tool used to assemble and disassemble of the bearing apparatus.

The inner ring 5 is formed on its outer circumference with the other (inner side) inner raceway surface 5a. It is adapted to be press fit onto the cylindrical portion 4b of the wheel hub 4 to form a double row angular contact ball bearing of a back-to-back duplex type. It is axially secured by a caulked portion 4c formed by plastically deforming the end of the cylindrical portion 4b. The inner ring 5 and balls 3 are made of high carbon chrome steel such as SUJ2. They are hardened to their core by dip quenching to have a surface hardness of 58~64 HRC.

The wheel hub 4 is made of medium carbon steel including carbon of 0.40~0.80% by weight such as S53C. It is hardened by high frequency induction quenching so that a region including the inner raceway surface 4a from the inner side base 6c of the wheel mounting flange 6 to the cylindrical portion 4b is formed with a hardened layer 8 (shown by cross-hatching) having a surface hardness of 58~64 HRC. The caulked portion 4c remains with its as is surface hardness after forging. Accordingly, the wheel mounting flange 6 has a sufficient mechanical strength against a rotary bending load applied thereto. The anti-fretting strength of the cylindrical portion 4b at a region press fit by the inner ring 5 can be improved. The plastically deforming working of the caulked portion 4c can be also carried out without any micro crack during the caulking process.

The outer member 2 is integrally formed on its outer circumference with a body mounting flange 2c to be mounted on a knuckle (not shown) of a vehicle. Its inner circumference has an outer side outer raceway surface 2a opposite to the inner raceway surface 4a of the wheel hub 4 and an inner side outer raceway surface 2b opposite to the inner raceway surface 5a of the inner ring 5. Double row ball groups 3, 3 are contained between these outer and inner raceway surfaces and are rollably held by cages 9, 10. Seals 11, 12 are mounted within annular space openings formed between the outer member 2 and the inner member 1. The seals prevent leakage of grease contained in the bearing and the entering of rain water and dusts into the bearing from the outside.

The outer member 2 is made of medium carbon steel including carbon of 0.40~0.80% by weight such as S53C. The double row outer raceway surfaces 2a, 2b are formed with a hardened layer 13 (shown by cross-hatching) hardened by high frequency induction quenching so as to have a surface hardness of 58~64 HRC. Although the structure shown here is a double row angular contact ball bearing using balls as rolling elements 3, a double row tapered roller bearing using tapered rollers as rolling elements 3 may be used. In addition, the wheel bearing apparatus of the present disclosure is not limited to the bearing structure of a third generation and may be applied to bearing structures of first, second and fourth generations.

According to a preferred embodiment, a pitch circle diameter PCDo of the outer side ball group 3 is set larger than a pitch circle diameter PCDi of the inner side ball group 3. Due to a difference in the pitch circle diameters PCDi and PCDo, the number of the balls in the group 3 in the outer side is larger than the number of balls in the group 3 in the inner side. This makes it possible to increase the rigidity of the outer side bearing compared with that of inner side bearing while effectively utilizing the bearing space and thus improving the life of bearing.

As shown in FIG. 2, the wheel hub 4 has an outline configuration from a groove bottom of the inner raceway surface 4a to the cylindrical portion 4b through a counter portion 15. A shaft-shaped portion 7 axially extends from the counter portion 15 via a stepped portion 7a, having a circular arc cross-section. A shoulder 7b abuts against the inner ring 5. A substantially axially extending conical recess 14 is formed in an outer side end portion of the wheel hub 4 in order to reduce the weight of the bearing apparatus. The recess 14 is formed by forging. The depth of the recess 14 extends to near the bottom of the outer side inner raceway surface 4a of the wheel hub 4 so that the outer side end portion of the wheel hub 4 has a substantially constant wall thickness. That is, since it is considered that the wheel hub 4 will be deformed over a contacting angle α of the outer side balls 3, the inventors have noticed that the wall thickness of the end portion of the wheel hub 4 outer than the contacting angle α.

The base portion 6c of the wheel mounting flange 6, forming a seal land portion, is formed with a circular arc cross-section. The inventors have tried to obtain the rigidity of the wheel hub by using a FEM analysis from a relationship between a minimum wall thickness t1 of the base portion 6c and a diameter d1 at that position. It has been found that it is possible to achieve the weight reduction while keeping the strength and rigidity of the wheel hub 4 corresponding to conditions of use of the wheel bearing apparatus by setting the minimum wall thickness t1 within a range of $0.2 \leq (t1/d1) \leq 0.3$. If the minimum wall thickness t1 of the base portion 6c is less than 20% of the diameter d1 of that portion, the deformation of the wheel hub 4 becomes excessive and thus desirable rigidity cannot be obtained. On the contrary, expected increase of the rigidity also cannot be obtained if the minimum wall thickness t1 exceeds 30% of the diameter d1 and rather this causes increase of weight of the wheel hub.

In addition, according to the preferred embodiment of the present disclosure, the minimum wall thickness t1 of the base portion 6c is set at at least twice an effective depth of the hardened layer 8. Similarly to the base portion 6c of the wheel mounting flange 6, a relationship between a minimum wall thickness t2 of the wheel hub 4 in a direction of the contacting angle α of the balls 3 and a diameter d2 (ball contacting diameter) at that position is within a range of $0.2 \leq (t2/d2) \leq 0.3$. The minimum wall thickness t2 is set at at least twice the effective depth of the hardened layer 8.

In a wheel bearing apparatus of this kind, although the hub 4 is usually designed so that it is able to stand a load corresponding to 0.8 G (gravitational acceleration) when a vehicle travels in a curved way, the maximum shearing stress is generated at a depth of about 0.4 mm of the inner raceway surface 4a due to contact with the balls 3. Since it is necessary to form a hardened layer 8 having a strength of at least about five times the maximum shearing stress in order to satisfy a desired rolling fatigue life, the effective hardened depth is set at 3.5 mm by adding on the minimum effective hardened depth of 2 mm variation of the hardened layer 8 formed by the high frequency induction quenching.

In the bearing apparatus for a wheel of vehicle having such a structure, the pitch circle diameter PCDo of the outer side ball group 3 is larger than the pitch circle diameter PCDi of the inner side ball group 3. Thus, the number of balls of the outer side ball group 3 is also larger than the number of balls of the inner side ball group 3. Accordingly, the rigidity of the bearing apparatus at the outer side can be increased and thus the life of the bearing apparatus can be extended. In addition, a recess 14 is formed at the outer side end portion of the wheel hub 4. The wall thickness t1, t2 are set within a predetermined range corresponding to the recess 14. Additionally, the depth of the hardened layer 8 is set within a predetermined range so that the wall thickness of the wheel hub 4 at this outer side end portion is substantially constant. This solves the antinomic problems of reducing the weight and size of the bearing apparatus while increasing the rigidity of the bearing apparatus.

On the other hand, in the outer member 2, due to the fact PCDo>PCDi, the diameter of the outer side outer raceway surface 2a is larger than that of the inner side outer raceway surface 2b. The outer side outer raceway surface 2a continues to the inner side outer raceway surface 2b via a cylindrical shoulder 16, a stepped portion 16a and a shoulder 17 of a smaller diameter. The inner diameter of the bottom of the inner side outer raceway surface 2b is set so that it has substantially the same diameter as the inner diameter of the shoulder 16 of a larger diameter side.

As shown in FIG. 3, the outer member 2, similarly to the wheel hub 4, is formed at least on its outer raceway surfaces 2a, 2b with a hardened layer 13. The hardened layer 13 has a strength about five times the maximum shearing stress in order to satisfy the desirable rolling fatigue life. The effective hardened depth is set at 3.5 mm by adding on the minimum effective hardened depth of 2 mm variation of the hardened layer 13 formed by the high frequency induction quenching.

In addition, in the outer member 2, the minimum wall thickness t3, t4 is set at 4 mm with the remaining no-quenching portion (non-hardened portion) of about 0.5 mm to prevent the generation of quenching cracks that would be caused on the minimum wall thickness portions (herein bottom portions of the outer raceway surfaces 2a, 2b). This makes it possible to solve the antinomic problems of reducing the weight and size of the wheel bearing apparatus while increasing the rigidity of the bearing apparatus.

The outer member 2 is formed with a predetermined forged configuration as shown in FIG. 4(a) (shown by two-dot chain lines) by forging a blank bar member. That is, the outer member 2 is forged with remaining portions including an inner side face 18a of the body mounting flange 2c against which a knuckle (not shown) abuts, an inner side outer circumferential surface 18b on which the knuckle fit, both end faces 19, 20, seal fitting surfaces 21, 22 on which the seals 11, 12 are fit, double row outer raceway surfaces 2a, 2b, and the shoulder 17 of the smaller diameter side with a remaining grinding allowance.

According to the preferred embodiment, a shoulder 16 of the larger diameter side is formed with a small tapered surface of relatively small inclination angle for the draft of forging and extends to near the base of the body mounting flange 2c. On the other hand an axial dimension of a shoulder 17 of the smaller diameter side is limited to a minimum length. A stepped portion 16a between the shoulder 17 of the smaller diameter side and the shoulder 16 of the larger diameter side is formed as a tapered surface with a predetermined inclined angle that is larger than the draft of forging. This reduces the material loss of the outer member 2 without reducing the strength and rigidity and improves the plastic flowability during forging and thus improves the machining accuracy. In addition, this makes the punching process easy and reduces the number of the punching step as well as reduces the material loss of the blank to achieve a reduction in the manufacturing cost.

On the other hand, the shoulder 17 of the smaller diameter side is formed with a predetermined inner diameter by turning after forging. The shoulder 16 of the larger diameter side and the stepped portion 16a remains as having their original forged surfaces without being turned. This further reduces the material loss and number of turning steps and thus further reduces the manufacturing cost.

FIG. 4(b) shows a modification of the embodiment shown in FIG. 4(a). In the outer member 2' of this modification, a shoulder 23 of the larger diameter side is formed by a tapered surface having a predetermined inclination. It extends from a cylindrical shoulder 17 of the smaller diameter side via a stepped portion 23a, having a circular arc cross-section. This reduces the material loss of the outer member 2' without reducing the strength and rigidity and improves the plastic flowability during forging.

On the other hand, the wheel hub 4 is formed with a predetermined forged configuration as shown in FIG. 5

(shown by two-dot chain lines) by gorging a bar member blank similar to the manufacturing method of the outer member 2 previously described. That is, an outer side face 24 of the wheel mounting flange 6, against which a brake rotor (not shown) abuts, and a pilot portion 25, for supporting a wheel and brake rotor, the base portion 6c of the wheel mounting flange 6, the inner raceway surface 4a, a counter portion 15 and the cylindrical portion 4b are forged with a remaining grinding allowance.

In this preferred embodiment the counter portion 15 is formed with a cylindrical configuration. A step portion 7a, connecting the counter portion 15 and the shaft-shaped portion 7, is formed with a circular arc cross-section. This reduces the material loss of the wheel hub 4 without reducing the strength and rigidity to improve the plastic flowability during forging and thus improves the machining accuracy. Although the counter portion 15 is formed with a predetermined configuration and dimensions by turning after forging, the shaft-shaped portion 7 and the stepped portion 7a remain as is with their original forged surfaces without being turned. This further reduces the material loss and number of turning steps and thus further reduces the manufacturing cost. The cross-sectional configuration of the step portion 7a is not limited to the circular arc and may be a tapered configuration having a predetermined inclined angle. In addition according to this embodiment, the step portion 16a, having a predetermined inclined angle, is formed between the shoulder 17 of the smaller diameter side and shoulder 16 of the larger diameter side. Thus, it may be possible to replace the step portion 16a and the shoulder portion 16 of the larger diameter side with a shoulder having one tapered surface.

As described above, according to the first preferred embodiment, the outer member 2 and the wheel hub 4 have forged configurations that improve the plastic flowability during forging without reducing the strength and rigidity. Thus, it is possible to improve the machining accuracy of forging and to reduce the portions to be turned to a minimum. Thus, this achieves a reduction in material loss, numbers of turning steps and the manufacturing cost.

FIG. 6 is a longitudinal section view showing a second embodiment of a vehicle wheel bearing apparatus. FIG. 7 is a explanatory longitudinal section view of the wheel bearing apparatus of FIG. 6 showing a grease filling step. Since the second embodiment is only partially different from the first embodiment in the structure of the wheel hub, the same reference numerals are used to designate the same parts as those having the same functions used in the first embodiment.

This wheel bearing apparatus is a third generation type used for a driven wheel. It has the inner member 26, the outer member 2, and double row ball groups 3, 3 freely rollably contained between the outer and inner members 26, 2. The inner member 26 includes a wheel hub 27 with the inner ring 5 press fit onto the wheel hub 27 via a predetermined interference.

The wheel hub 27 is integrally formed with the wheel mounting flange 6 at its outer side end. One (outer side) inner raceway surface 4a is formed on its outer circumference. A cylindrical portion 4b extends from the inner raceway surface 4a through a shaft-shaped portion 7.

The wheel hub 27 has an outline configuration from a groove bottom of the inner raceway surface 4a to the cylindrical portion 4b through a counter portion 15. A shaft-shaped portion 7 axially extends from the counter portion 15, via a substantially vertically stepped portion 7c. A shoulder 7b abuts against the inner ring 5. The conical recess 14 is formed at an outer side end portion of the wheel hub 27. The depth of the recess 14 extends to near the bottom of the outer side inner raceway surface 4a of the wheel hub 27 so that the outer side end portion of the wheel hub 27 has a substantially constant wall thickness. Due to a difference in the pitch circle diameters PCDi and PCDo, the diameter of the inner raceway surface 4a of the wheel hub 27 is larger than that of the inner raceway surface 5a of the inner ring 5. The outer diameter of the shaft-shaped portion 7 is set so that it is substantially the same as the groove bottom diameter of the inner raceway surface 5a.

The wheel hub 27 is made of medium carbon steel including carbon of 0.40~0.80% by weight such as S53C. It is hardened by high frequency induction quenching so that a region including the inner raceway surface 4a from the inner side base 6c of the wheel mounting flange 6 to the cylindrical portion 4b is hardened to have a surface hardness of 58~64 HRC.

In the second embodiment, an amount of grease filled within each of left and right bearing rows is set in proportion to a volume ratio of the inside space within each of left and right bearing rows. That is, the outer side bearing row is filled with grease at a ratio of 40~60% preferably 45~55%, relative to the whole space volume of the outer side. The inner side bearing row is filled grease at a ratio of 40~60% preferably 45~55% relative to the whole space volume of the inner side. In addition, variation of the weight of grease in the left and right bearing rows is limited to a range within ±20%. In this specification, the term "whole space volume" of the outer and inner sides means a whole space volume from pitch circles of balls 3, 3 of outer and inner bearing rows to inner sides of bearing, respectively, of the outer seal 11 and inner seal 12.

As shown in FIG. 7, the grease is filled within the bearing by previously holding the double rows of balls 3, 3 by the cages 9, 10, and by inserting a grease filling device 28 toward a direction shown by an arrow with the ball cassettes being fit into the inner member 2. That is, a predetermined amount of grease is filled by oppositely arranging a plurality of double row nozzles 28a, 28b radially projected from the grease filling device 28 toward the double rows ball cassettes.

A diameter (do) of each nozzle 28a of the outer side row is larger than that of each nozzle 28b of the inner side row. The square ratio is set so that it corresponds to the ratio of inside space volumes of the left and right rows. This enables an optimum filling amount of grease despite the difference in the inside space volumes of the left and right rows owing to the difference in the pitch circle diameters PCDo, PCDi of the double rows of balls 3, 3. Accordingly, it is possible to solve problems such as leakage of grease during travel of a vehicle and increase of rotational torque of the wheel bearing apparatus.

Although it is described above that the filling amount of grease is controlled by changing the diameters do, di of the nozzles 28a, 28b of the outer and inner sides, the present disclosure is not limited to such an arrangement and the control of the filling amount of grease may be achieved by changing the number of the nozzles 28a, 28b of the outer and inner sides.

FIG. 8 is a longitudinal section view showing a third embodiment of a vehicle wheel bearing apparatus. FIG. 9(a) is a front elevation view showing a method for machining the outer member of FIG. 8. FIG. 9(b) is a longitudinal section view taken along a line IX-IX of FIG. 9(a). Since the third embodiment is only partially different from the second embodiment (FIG. 6) in the structure of the outer member, the same reference numerals are used to designate the same parts as those having the same functions used in the previous embodiments.

This wheel bearing apparatus is a third generation type used for a driven wheel. It includes the inner member 26, an outer member 29, and double row ball groups 3, 3 freely rollably contained between the outer and inner members 29, 26. The outer member 29 is integrally formed, on its outer circumference, with a body mounting flange 2c to be mounted on the aluminum alloy knuckle N. It inner circumference includes double row outer raceway surface 2a, 2b. The outer member 29 is made of medium carbon steel including carbon of 0.40~0.80% by weight such as S53C. The double row outer raceway surfaces 2a, 2b are hardened to have a surface hardness of 58~64 HRC.

The outer member 29 to be fit in the aluminum alloy knuckle N is formed with an insulating coating 30 (shown by cross-hatching) by dacrotized treatment on its surfaces against which the knuckle N abuts. The inner side face 18a of the body mounting flange 2c and an outer circumferential surface 18b are the abutting surfaces. This prevents the generation of electric corrosion on the knuckle N. That is, when two kinds of metals such as steel of the outer member 29 and light alloy of the knuckle N are exposed to a corrosion circumstances, metal of lower potential difference (in this case aluminum alloy of the knuckle) becomes an anode and causes the premature corrosion. The insulating coating 30 prevents the premature electric corrosion of the knuckle N caused by combination of different kinds of metals, the galvanic corrosion.

For example, nickel plating or zinc plating, or cationic electro-deposition or fluorocarbon electro-deposition other than the dacrotized treatment may be used. The insulating coating 30 may be applied to a whole outer circumferential surface in order to reduce the manufacturing steps such as masking etc.

A supporting surface 31 is formed on the outer circumference of the outer side end. The outer circumference of the outer member of an opposite side end of the inner side on which the insulating coating 30 is formed. The supporting surface 31 is finished to have a cylindrical configuration by grinding. FIG. 9 shows a method for grinding the double row outer raceway surfaces 2a, 2b of the outer member 29. The outer side end face 19 of the outer member 29 is magnetically attracted onto a backing plate 32. The outer member 29 is rotationally supported under a centered condition with the supporting surface being slidably supported by a pair of shoes 33, 33. Under such a condition, the double row outer raceway surfaces 2a, 2b and the shoulder 17 of the smaller diameter side are simultaneously ground. The outer circumferential surface of a formed grinding wheel 34 is previously formed to have an outline configuration corresponding to those of the double row raceway surfaces 2a, 2b by a rotary dresser.

As described above, in the third embodiment, since the insulating coating 30 is formed on the outer circumferential surface of the outer member 29 abutting against the knuckle N. The supporting surface 31 is formed on the outer circumferential surface of the outer member 29 not abutting against the knuckle N. Thus, it is possible to keep good insulation between the knuckle N and the outer member 29 without peeling-off the insulating coating 30 due to sliding contact between the shoes 33 and the outer member 29. Accordingly, it is possible to prevent generation of electric corrosion on the knuckle that would be caused by a combination of the steel outer member and the light alloy knuckle. Thus, this provides a wheel bearing having improved reliability.

FIG. 10 shows a modification of the outer member of FIG. 9 and is a view for a grinding work applied thereto. The outer member 35 is formed with the insulating coating 30 by a dacrotized treatment on its inner side face 18a of the body mounting flange 2c and on the outer circumferential surface 18b of the inner side end. A supporting surface 36 forming a stepped portion of a smaller diameter is formed over a region from the inner side end 20 to a predetermined length by grinding off a portion of the insulating coating 30. Different from the embodiment of FIG. 9(b), in this modification, the inner side end face 20 of the outer member 35 is magnetically held onto a backing plate 32 and the outer member 29 is centered with the supporting surface 36 being slidably supported by a pair of shoes 33, 33. Under such a condition the double row outer raceway surfaces 2a, 2b and the shoulder 17 of the smaller diameter side are simultaneously ground by a formed grinding wheel 37.

According to the third embodiment, the insulating coating 30 is formed on the outer circumferential surface of the outer member 35 abutting against the knuckle N. The supporting surface 36 is formed by grinding off a portion of the insulating coating 30. Thus, it is possible to slidably support the outer member 35 by shoes 33 and to obtain a good insulation between the knuckle N and the outer member 35 because the ground-off supported surface 36 does not contact the knuckle N. Accordingly, it is possible to prevent the generation of electric corrosion on the knuckle that would be caused by a combination of the steel outer member and the light alloy knuckle and to provide a wheel bearing having reduced weight and size.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The vehicle wheel bearing apparatus of the present disclosure can be applied to any of the bearing apparatus of the first~fourth generations irrespective for the driving wheel or the driven wheel.

What is claimed is:

1. A vehicle wheel bearing apparatus comprising:
   an outer member formed with double row outer raceway surfaces on its inner circumference;
   an inner member formed, on its outer circumference surface, with double row inner raceway surfaces arranged oppositely to the double row outer raceway surfaces;
   double row ball groups freely rollably contained between the outer raceway surfaces and inner raceway surfaces, respectively, of the outer member and the inner members;
   the outer member is made of medium carbon steel including carbon of 0.40~0.80% by weight, it is hardened by high frequency induction quenching so that each of the outer raceway surfaces is formed with a hardened layer having surface hardness of 58~64 HRC; and
   an effective depth of the hardened layer is set at at least 2 mm and the minimum wall thickness of the outer member at these outer raceway surfaces is set at at least 4 mm.

2. The vehicle wheel bearing apparatus of claim 1 wherein a pitch circle diameter of the double row ball group of the outer side is larger than a pitch circle diameter of the double row ball group of the inner side.

3. The vehicle wheel bearing apparatus of claim 2 wherein an amount of grease filled within each of a left and right bearing rows is set in proportion to a volume ratio of an inside space within each of the left and right bearing rows.

4. The vehicle wheel bearing apparatus of claim 3 wherein an amount of grease filled within each of the left and right bearing rows is set within a range of 40~60% of the volume of an inside space of each of the left and right bearing rows.

5. The vehicle wheel bearing apparatus of claim 2 wherein the outer diameter of each ball of the ball groups is the same as each other, and the number of balls of the outer side is larger than the number of balls of the inner side.

6. The vehicle wheel bearing apparatus of claim 1 wherein said inner member comprises a wheel hub and an inner ring, the wheel hub having a wheel mounting formed integrally at one end, one inner raceway surface is formed on the outer circumference opposite to one of the double row outer raceway surfaces, a cylindrical portion axially extends from the inner raceway surface via a shaft-shaped portion, the inner ring being fit onto the cylindrical portion of the wheel hub via a predetermined interference and formed on its outer circumference with the other inner raceway surface opposite to the other raceway surface of the double row outer raceway surfaces; a predetermined hardened layer is continuously formed by high frequency induction quenching in a region from an inner side base of the wheel mounting flange of the wheel hub to the cylindrical portion; a substantially conical recess is formed at an outer side end portion of the wheel hub and the depth of the recess extends to at least near the bottom of the inner raceway surface of the wheel hub so that a wall thickness of the wheel hub at the inner raceway surface is set within a predetermined range; and a wall thickness of the outer side end of the wheel hub is substantially constant corresponding to the configuration of the recess and has at least twice the effective depth of the hardened layer.

7. The vehicle wheel bearing apparatus of claim 6 wherein the minimum thickness of the wheel hub at the inner raceway surface is set within a range of 0.2~0.3 times a diameter at that position.

8. The vehicle wheel bearing apparatus of claim 6 wherein a counter portion of the inner raceway surface of the wheel hub is formed with a cylindrical configuration and a stepped portion connecting the counter portion and the shaft-shaped portion is formed with a cross-section of a circular arc or tapered configuration, and the shaft-shaped portion and the stepped portion remain as forged surfaces.

9. The vehicle wheel bearing apparatus of claim 1 wherein shoulders are formed, respectively, adjacent to the double row outer raceway surfaces; a stepped portion between the shoulder of the larger diameter side and the shoulder of the smaller diameter side is formed by a tapered surface of a predetermined inclination or a shoulder of the larger diameter side is formed as a tapered surface extending from the shoulder of the smaller diameter side toward the outer raceway surface of the larger diameter side while increasing its diameter, and the stepped portions and the shoulders remain as forged surfaces.

10. The vehicle wheel bearing apparatus of claim 9 wherein the outer member is integrally formed on its outer circumference with a body mounting flange to be mounted on a knuckle (N) of a body of a vehicle, and the shoulder of the larger diameter side extends to a position near the base of the body mounting flange.

11. The vehicle wheel bearing apparatus claim 9 wherein the shoulder of the larger diameter side is formed by a tapered surface of a predetermined inclination and a stepped portion between the shoulder of the larger diameter side and the shoulder of the smaller diameter side has a cross-section of circular arc configuration.

12. The vehicle wheel bearing apparatus of claim 1 wherein the outer member is fit into the light alloy knuckle and at least an outer circumferential surface of the outer member contacting the knuckle is formed with an insulating coating and a circumferential surface other than said outer circumferential surface of the outer member contacting the knuckle is formed with a cylindrical supporting surface ground over a predetermined axial length.

13. The vehicle wheel bearing apparatus of claim 12 wherein the outer member is integrally formed, on its outer circumference, with a body mounting flange to be mounted on the knuckle, wherein the knuckle is fit onto an inner side outer circumference of the body mounting flange, and the supporting surface is formed on the outer circumferential surface of an outer side end of the outer member.

14. The vehicle wheel bearing apparatus of claim 12 wherein the outer member is integrally, formed on its outer circumference, with a body mounting flange to be mounted on the knuckle, wherein the knuckle is fit onto an inner side outer circumference of the body mounting flange, and an insulating coating removed cylindrical portion is formed over a predetermined length from an inner side end face of the outer member and the insulating coating removed cylindrical portion functions as the supporting surface.

* * * * *